Figure 3:
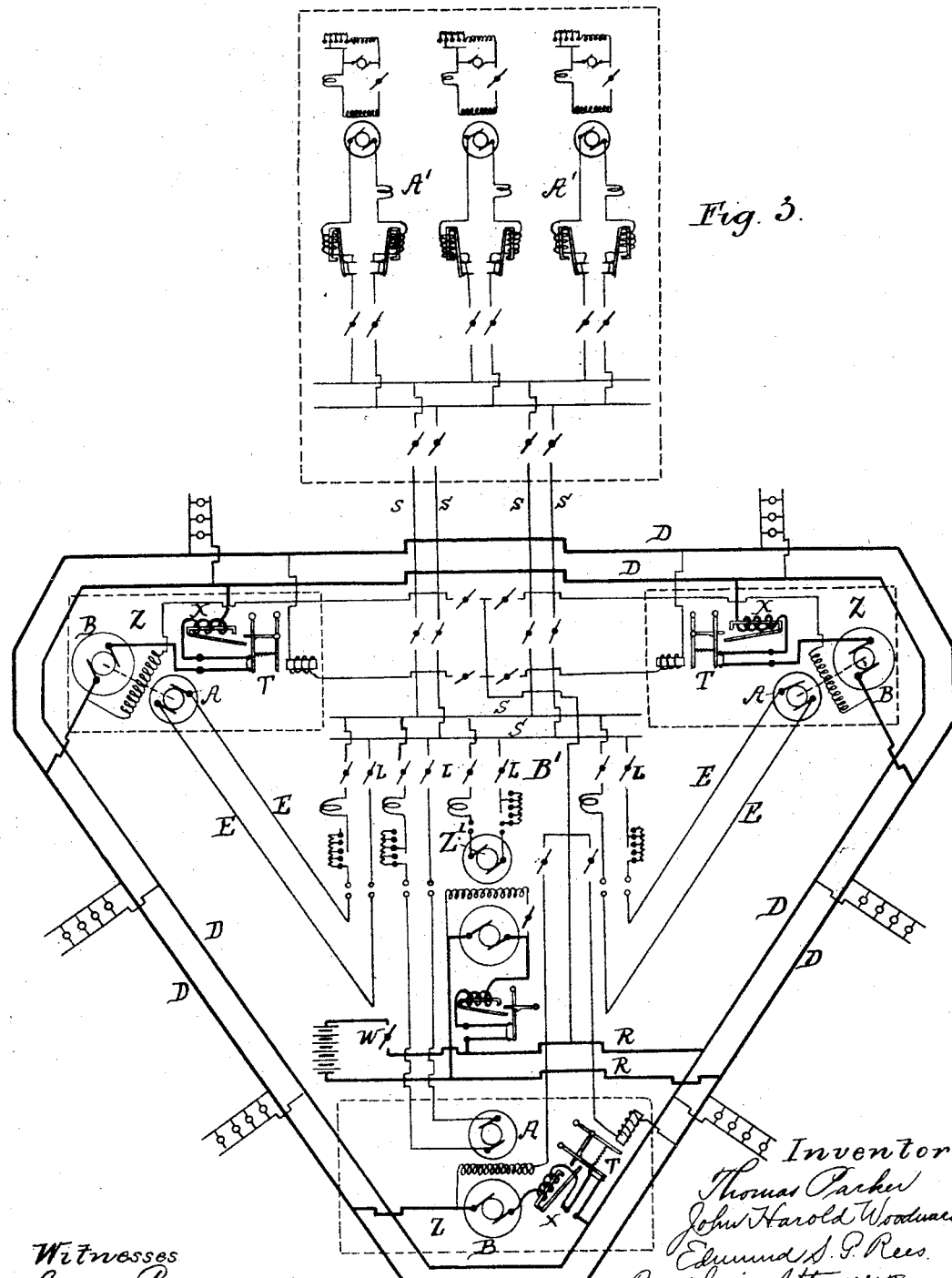

(No Model.) 6 Sheets—Sheet 1.
T. PARKER, J. H. WOODWARD & E. S. G. REES.
DISTRIBUTION OF ELECTRICITY.
No. 531,962. Patented Jan. 1, 1895.
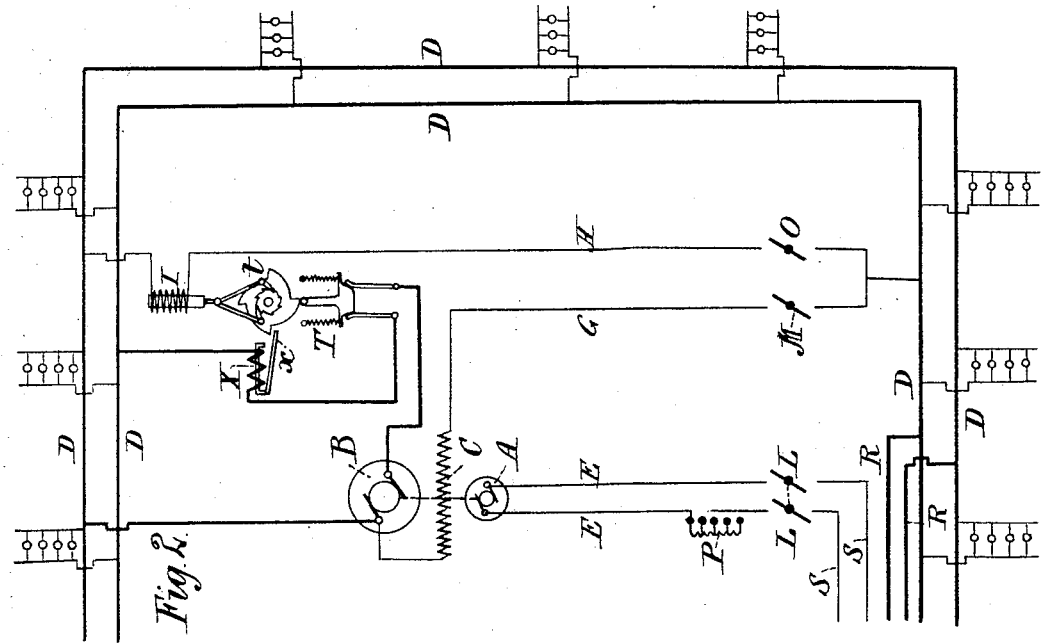
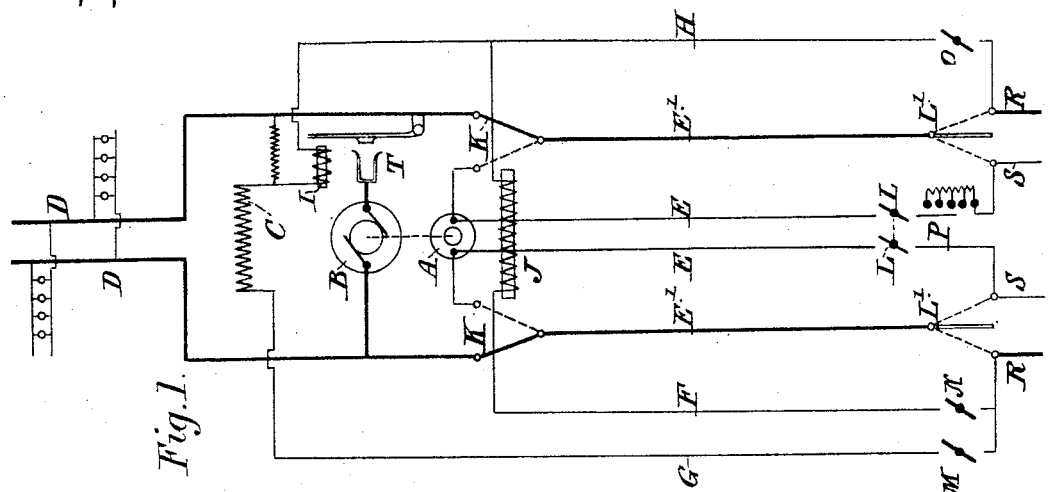
Witnesses.
George Baumann
James Gracie
Inventors
Thomas Parker
John Harold Woodward
Edmund S. G. Rees.
By their Attorneys.
Howson & Howson (No Model.) 6 Sheets—Sheet 2.
T. PARKER, J. H. WOODWARD & E. S. G. REES.
DISTRIBUTION OF ELECTRICITY.

No. 531,962. Patented Jan. 1, 1895.

(No Model.) 6 Sheets—Sheet 4.

T. PARKER, J. H. WOODWARD & E. S. G. REES.
DISTRIBUTION OF ELECTRICITY.

No. 531,962. Patented Jan. 1, 1895.

Witnesses
George Baumann
James Gracir

Inventors
Thomas Parker, John Harold Woodward & E. S. G. Rees.
By their Attorneys
Howson & Howson (No Model.) 6 Sheets—Sheet 5.
T. PARKER, J. H. WOODWARD & E. S. G. REES.
DISTRIBUTION OF ELECTRICITY.
No. 531,962. Patented Jan. 1, 1895.
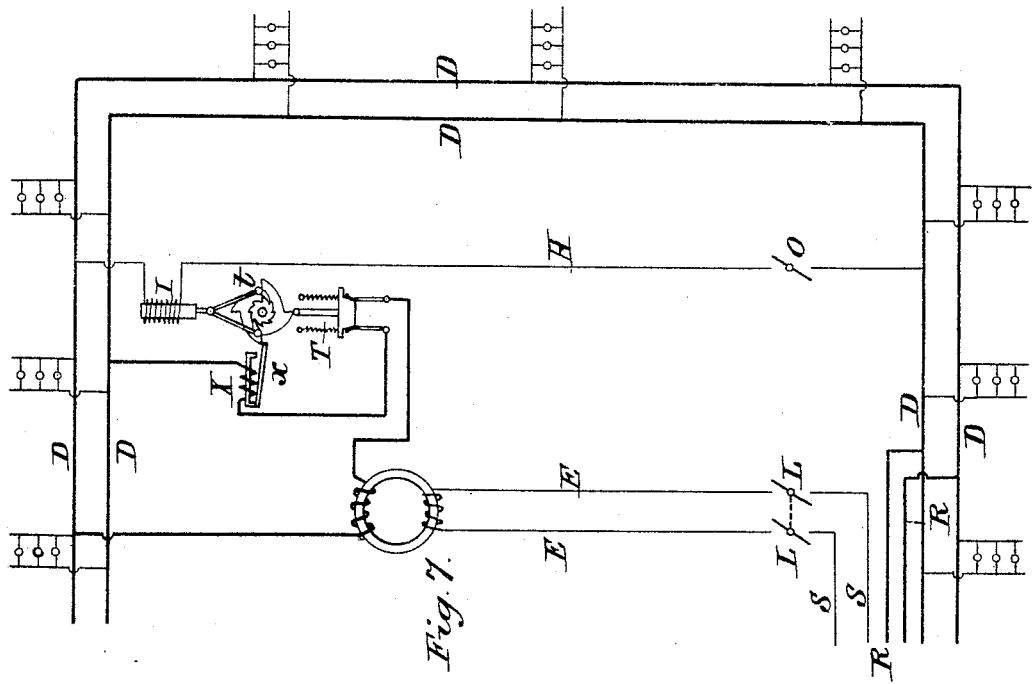
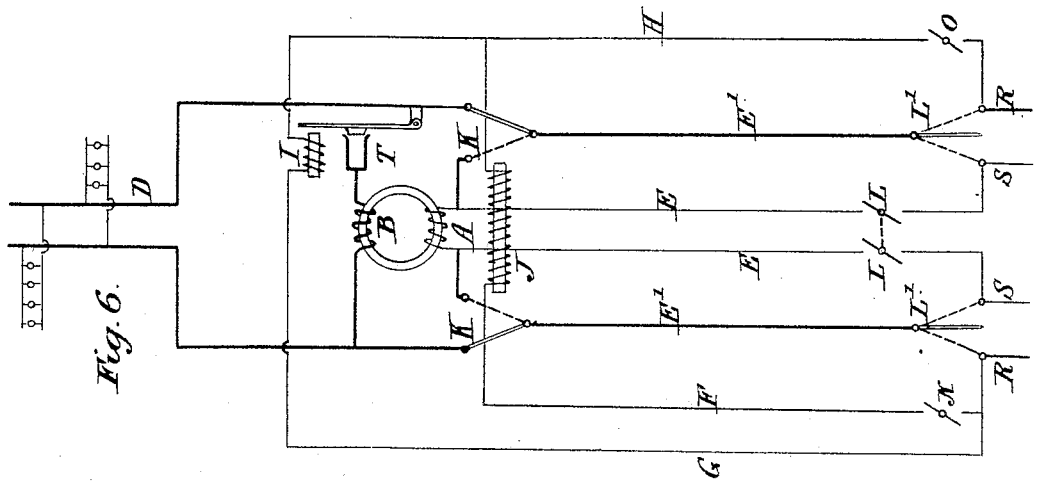
Witnesses
James Gracie
S. C. Connor
Inventors
Thomas Parker,
John H. Woodward, and
Edmund S. G. Rees
by Howson and Howson
their attorneys (No Model.) 6 Sheets—Sheet 6.
T. PARKER, J. H. WOODWARD & E. S. G. REES.
DISTRIBUTION OF ELECTRICITY.
No. 531,962. Patented Jan. 1, 1895.
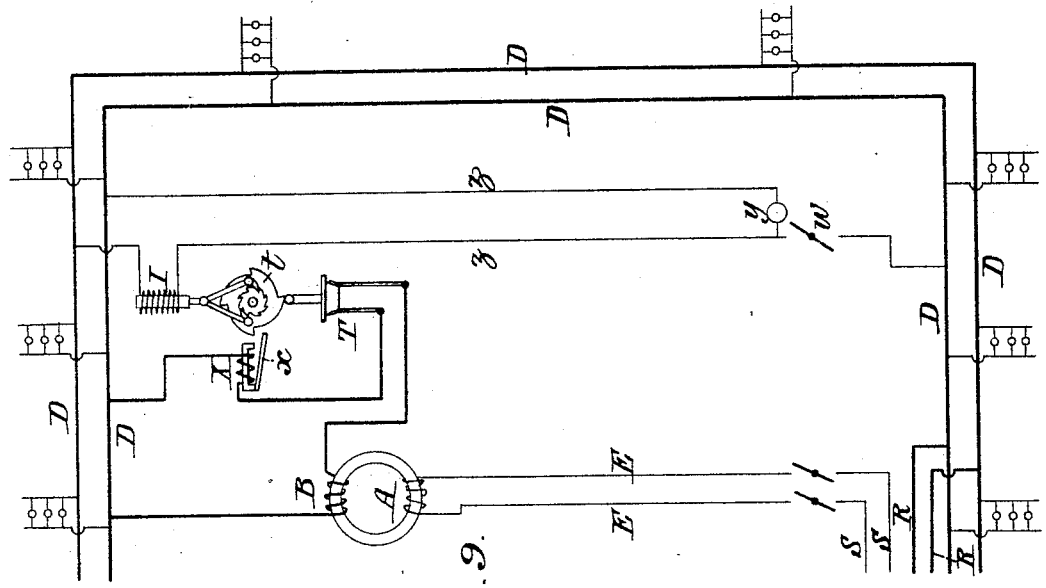
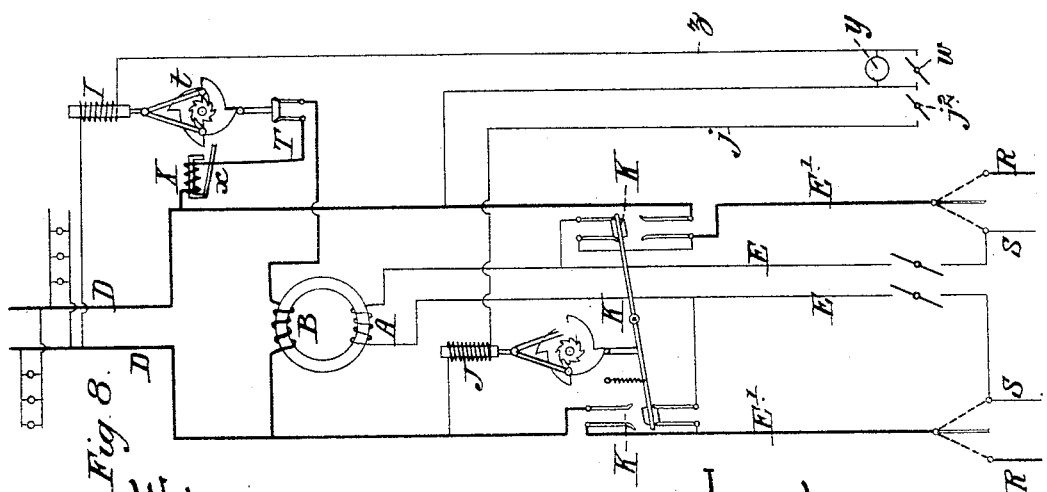

UNITED STATES PATENT OFFICE.

THOMAS PARKER, JOHN HAROLD WOODWARD, AND EDMUND S. G. REES, OF WOLVERHAMPTON, ENGLAND.

DISTRIBUTION OF ELECTRICITY.

SPECIFICATION forming part of Letters Patent No. 531,962, dated January 1, 1895.

Application filed February 24, 1892. Serial No. 422,688. (No model.) Patented in England October 10, 1890, No. 16,110, and October 24, 1891, No. 18,348.

*To all whom it may concern:*

Be it known that we, THOMAS PARKER, works-director of the Electric Construction Corporation, Limited, and JOHN HAROLD WOODWARD and EDMUND SCOTT GUSTAVE REES, electrical engineers, of Wolverhampton, in the county of Stafford, England, subjects of the Queen of Great Britain and Ireland, have invented certain Improvements in the Distribution of Electricity, (for which we have obtained patents in Great Britain, No. 16,110, dated October 10, 1890, and No. 18,348, dated October 24, 1891,) of which the following is a specification.

Our invention relates to an improved system of starting, stopping and controlling electric currents whereby an economical and efficient distribution of electricity from central or generating stations is obtained by means of high tension currents and a motor generator or transformer or motor generators or transformers (we will refer to them as motor generators) for transforming the current to the electro-motive force required for the lamps, motors or equivalent translating devices being supplied (these we shall refer to as lamps) and our said invention consists in arrangements for starting, stopping and generally controlling the motor generators situated at sub-stations by means of switches at a switch station or switch stations, which switch station or stations may be situated at the generating station or at any convenient place or places in the district to be supplied. The motor generators at the sub-stations are supplied with high tension currents from the switch station or stations (these being supplied from the generating station) and the circuit or circuits from the switch station or stations to the sub-stations and the switches for controlling these circuits and currents are so arranged that when the low tension or distributing mains supplying the lamps consist of a number of detached circuits each supplying a comparatively small number of lamps and fed by motor generators the said motor generators are stopped when only a small number of these lamps is in use and the low tension current required to maintain such small number of lamps is supplied from the switch station direct at a suitable electro-motive force through the same leads as those used for supplying the high tension current to the motor generators.

In certain cases where the low tension or distributing mains form a network throughout the area supplied with current it is more convenient when only a small number of the lamps is in use to stop the motor generators and to supply the necessary current at a suitable electro-motive force direct from the switch station or stations feeding into the network direct at a point or points nearest to the switch station or stations. The current which is supplied direct from the switch station or stations to the low tension or distributing mains may be taken from a low tension dynamo or dynamos, or from motor generators or accumulators situated at the switch station or stations. This system of distribution and controlling the supply of current from a switch station or stations may (when continuous currents are employed) be used in conjunction with accumulators situated at the switch station or stations or at the sub-stations; and in order that our said invention may be fully understood we shall now proceed more particularly to describe the same and for that purpose shall refer to the several figures of the annexed drawings.

Figure 4:
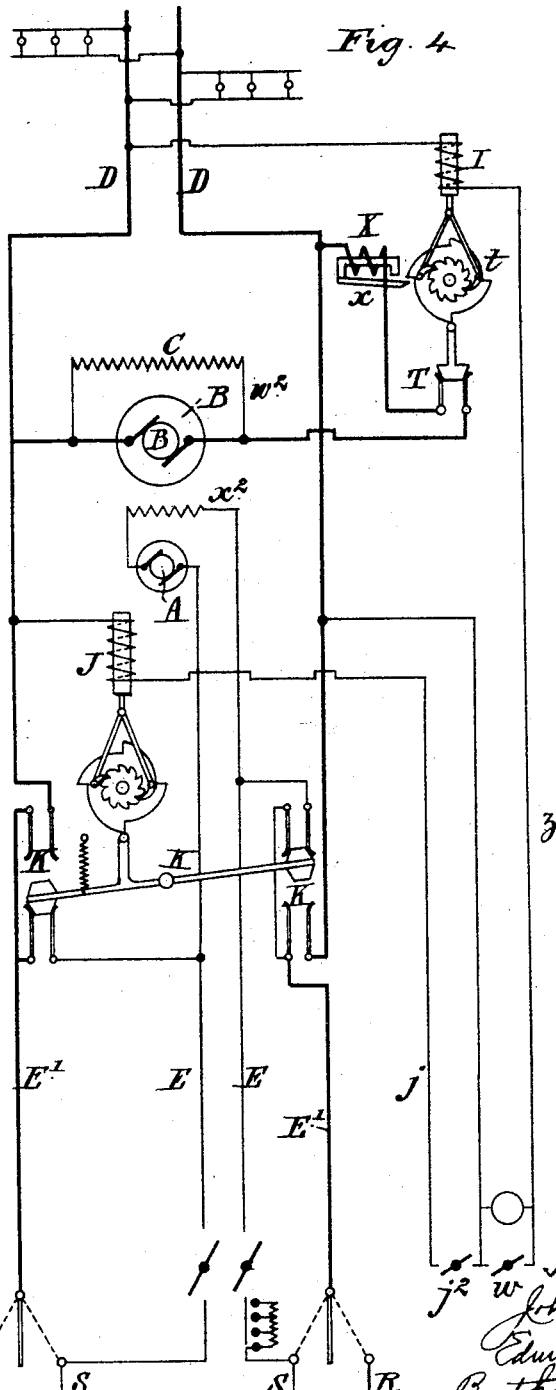
Figure 5:
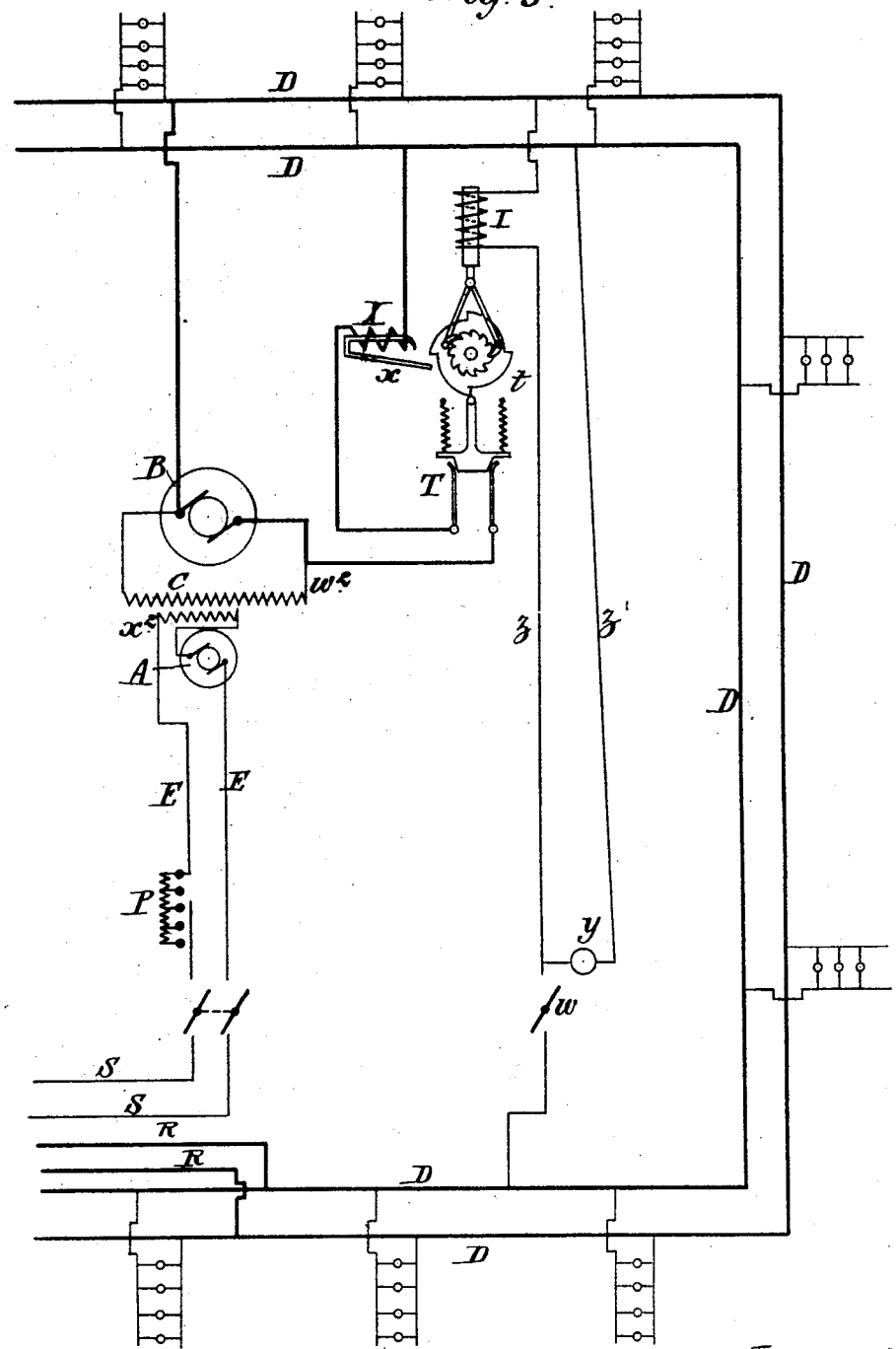

Figure 1 is a diagram representing an arrangement of circuits (wherein continuous currents are used) and switches such that when only a small number of lamps is in use the motor-generators may be stopped and the necessary current to supply this small number of lamps be fed through the high tension mains at a suitable electro-motive force direct from the switch station. Fig. 2 represents an arrangement in which there is a network of low tension or distributing mains connected directly to the switch station so that when only a small number of lamps is in use the continuous current motor generators are stopped and the current is then supplied directly into the network from the switch station at a suitable electro-motive force. Fig. 3 is a diagram representing the general arrangement of a complete distribution system corresponding with Fig. 2. Figs. 4 and 5 are modifications in the arrangement of the circuits as hereinafter described. Figs. 6, 7, 8 and 9 are modifications corresponding with Figs. 1, 2, 4 and 5, except that alternating current transformers are substituted in place of the motor generators.

Referring to the arrangement illustrated in Fig. 1, A represents the high tension armature, and B the low tension armature of a motor generator having a field magnetizing circuit C and supplying low tension current to the distributing mains D. This motor-generator is supplied with a starting current through thin wire leads E, and when running with load is supplied through thicker leads E′ connected in parallel with the leads E as hereinafter explained.

G is a wire conveying current from the switch station for energizing the field magnet circuit C of the motor generator. Another wire F is provided for energizing the electro-magnet J for moving over the switches K so as to connect the leads E′ with the terminals of the high tension armature A.

The switch station is provided with two two-way switches L′ for connecting the leads E′ with the high tension mains S or with the low tension mains R the high tension mains S being supplied with current from the generating station. The low tension mains R are supplied from a motor generator, low tension dynamo or accumulators situated at the switch station.

The switches at M, N and O and the switch P are provided at the switch station for controlling the currents in the leads G, F, and H and the resistance coils respectively.

When only a small amount of current is being taken from the distributing mains D all the switches at the switch station (with the exception of those marked L′) are "off" those marked L′ being in position for making contact so that low tension current is supplied directly from the leads R through the leads E′ and switches K to the said distributing mains. Under these conditions the motor generator A B is out of action.

When a larger current is required in the distributing main the switch M is closed thereby energizing the magnets C of the motor generator. The switch L is then closed and completes the circuit from the high tension mains S through the leads E to the high tension armature A so as to start the motor generator. A resistance P may be inserted in circuit to enable the current to be turned on gradually at starting. The switch O is then closed so that the electro magnet I is energized and operates the switch T and so connects the low tension armature B in multiple arc with the distributing mains D. The switches L′ are then placed in an intermediate position so as to cut off the supply of low tension current from the leads R. The switch N is now closed and energizes the electro magnet J which operates the switches K so as to connect the leads E′ with the armature A. The switches L′ are then thrown over to connect the leads E′ with the high tension mains S thereby enabling the motor generator to be supplied with current up to its full capacity partly through the leads E and partly through the leads E′, the former leads being alone of insufficient capacity. The regulation of the electro motive force at the terminals of the armature B may be obtained in the usual manner by varying the electro-motive force of the current supplied to the armature A.

In order to put the motor generator out of action the switches are operated in reverse order and restored to their original positions so as to connect the mains D with the low tension leads R.

Referring now to the modified arrangement illustrated in Fig. 2, the distributing mains D being brought into the switch station are supplied when only a small amount of current is being used by the leads R directly from a motor generator or a low tension dynamo or accumulators situated at the switch station. When a larger amount is required the switch M is closed thus energizing the field magnets C of the motor generator. By closing the switches L the high tension mains S S are connected through the mains E to the high tension armature A thereby starting the motor generator. A resistance and switch P may as in the example Fig. 1 be used to regulate the amount of current in starting. The switch O is then closed so as to energize the electro magnet I which operates the switch T so as to connect the low tension armature B to the distributing mains D. The switch T in this case is arranged so that on completing the circuit at O an electro magnet I is energized which pulls in the switch. The switch O may now be turned off leaving the switch T still on. On again completing the circuit at O the switch T is pulled off and so on alternately. The switch T may as shown at Fig. 2 be arranged in conjunction with an electro magnet X round which the main low tension current passes. This electro magnet attracts an armature $x$ when the current exceeds a certain amount, releases the catch wheel $t$ of the switch T and so breaks the circuit but still leaves the switch T so that it can be put on again by energizing the electro magnet I from the switch station. The construction of this switch T is more fully shown and described in and forms the subject of an application for Letters Patent filed by us February 24, 1892, Serial No. 422,687.

The electro motive force at the terminals of the motor generator may be regulated by the ordinary means and the said motor generator be stopped by manipulating the switches in the order reverse to that observed in starting.

In the distribution system illustrated in the diagram Fig. 3 three transformer substations Z Z Z are employed in combination with a central switch station B′ receiving the current from generators at A′. Another motor generator Z′ is provided at the switch station combined with accumulators with switches W so arranged that they may be connected up to charge or discharge from or into the distributing mains. The connections and switches at the central switch station in Fig. 3 are arranged to operate in the same way as those hereinbefore described with reference to Fig. 2.

We have hereinbefore referred to continuous current or motor generators but alternating current transformers may be used in place thereof with such modification in the arrangement as will be clearly apparent from the preceding description. For instance in Fig. 6 we have shown a construction or arrangement of circuits corresponding with Fig. 1, except that the motor generator has been replaced by an alternating current transformer; so the arrangement shown in Fig. 7 corresponds with that shown in Fig. 2, the arrangement shown in Fig. 8 corresponds with that shown in Fig. 4, and the arrangement shown in Fig. 9 corresponds with that shown in Fig. 5, except that in each instance the motor generator is replaced by an alternating current transformer. The constructions and operations of these circuits and systems shown in Figs. 6, 7, 8 and 9 will be understood from the preceding description without further explanation.

In order to decrease the number of wires necessary for the working of the aforesaid electrical distribution system we may use the arrangements illustrated by Figs. 4 and 5 as modifications of those we have described with reference to Figs. 1 and 2. Fig. 4 represents an arrangement corresponding to Fig. 1 and Fig. 5 represents an arrangement corresponding to Fig. 2. In these modifications we utilize the voltmeter or "pilot" wires which are usually employed in systems of electric distribution with feeders for actuating a voltmeter at the regulating apparatus the said wires being connected across the mains.

Fig. 4 shows the pilot wires utilized for operating a switch such as $t$ acting to complete and break a circuit like that operated by the solenoid or magnet marked I in Fig. 1, connecting or disconnecting the low tension armature B with the distributing mains D. The pilot wires are arranged with a switch $w$ which corresponds to the switch O in the preceding figures and one of these wires and the wire $j$ act as the circuit for the solenoid J of the switch K, so that by operating the switch $j^2$, which corresponds to the switch N in Fig. 1, the current is caused to actuate the switch to cause the contact maker K to open and close circuits as described with regard to the contact makers K in Fig. 1. The voltmeter in this case may be connected to either $z$ or $j$.

In Fig. 5 the pilot or voltmeter wires (marked $z$) are shown as being utilized for working the switch or switches in the distribution system, one of the wires running to each voltmeter $y$ being connected in circuit with the winding of a magnet such as that employed for actuating the switch $t$ in Fig. 2. We place the voltmeter permanently across the wires which go to the secondary network and when it is necessary to connect or disconnect the low tension network to or from the motor generator or transformer the circuit through the voltmeter wire or wires and switch magnet is made or closed by a switch such as that shown at $w$ for example, which corresponds to the switch O in Figs. 1 and 2, so as to short circuit the voltmeter and then opened or broken so as to leave the voltmeter in the pilot wire circuit reading across the mains as usual, the momentary fluctuation produced on the voltmeter by the operation of the switch $w$ being of course disregarded. The voltmeter requires to be of such a resistance that the current passing through the voltmeter would not be sufficient to influence the magnet and switch.

In certain cases such as in the hereinbefore described system of electrical distribution where it is not advisable to take a wire (such as that marked G in Fig. 2) from the magnet winding of the motor generator to the switch station the main coils $c$ for energizing the field magnets may be connected as at $w^2$ in Figs. 4 and 5 permanently across the brushes of the low tension armature B, the motor generator being started from the switch station by passing a current through the high tension armature A′ from the primary or high tension mains S, setting the brushes of the motor generator with a lead in the direction of rotation or otherwise distorting the field produced by the current through the armature relatively to the magnet circuit or by passing the current supplied to the high tension armature through a few extra coils $x^2$ on the magnets thus giving an initial field to assist the motor generator in starting. In Figs. 4 and 5 the parts which correspond with those shown in Figs. 1 and 2 are marked with the same letters of reference.

Inasmuch as motor generators, as described in this specification, are in their nature transformers, we wish it to be understood that where in the following claims the expression "transformer" is used it is to be understood in a sufficiently comprehensive sense to embrace both what has been termed a motor generator and also an alternating current transformer.

We claim as our invention—

1. An electrical distribution system comprising means for supplying either high or low tension currents, with a sub-station or sub-stations having transformers, distributing mains and two sets of conductors to the transformers, circuits and switches controlled from the switch station, substantially as described, whereby either low tension currents can be supplied direct to the distributing mains or the transformers may be thrown into circuit to convert the high tension current from the supply into low tension for the distributing mains, substantially as set forth.

2. An electrical distribution system having high tension mains and distributing mains with transformers between the high tension mains and distributing mains, a switch station or stations, pilot or voltmeter-wires from the distributing mains to the switch station, and switches controlled through the said pilot or voltmeter wires to cut the transformers in and out, as set forth.

In testimony whereof we have signed our names to this specification in the presence of two subscribing witnesses.

THOMAS PARKER.
JOHN HAROLD WOODWARD.
EDMUND S. G. REES.

Witnesses:
C. LEMESLE ADAMS,
    *Not. Pub., Wolverhampton.*
HENRY DUNN,
    13 *Hunter Street, Wolverhampton.*